US008333179B2

(12) United States Patent
Mallebrein et al.

(10) Patent No.: US 8,333,179 B2
(45) Date of Patent: Dec. 18, 2012

(54) METHOD FOR TAKING THE OUTGASSING OF FUEL FROM THE ENGINE OIL OF AN INTERNAL COMBUSTION ENGINE INTO ACCOUNT

(75) Inventors: Georg Mallebrein, Korntal-Muenchingen (DE); Federico Buganza, Nonantola (IT); Carlos Koster, Campinas (BR); Kai Jakobs, Filderstadt (DE); Juergen Pfeiffer, Pforzheim (DE); Emilie Hincker-Piocelle, Ludwigsburg (DE); Pierre-Yves Crepin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/203,478

(22) Filed: Sep. 3, 2008

(65) Prior Publication Data

US 2009/0133678 A1 May 28, 2009

(30) Foreign Application Priority Data

Sep. 6, 2007 (DE) ......................... 10 2007 042 408

(51) Int. Cl.
*F02D 41/14* (2006.01)
*F02D 41/06* (2006.01)
*G06F 19/00* (2011.01)
*F02M 41/06* (2006.01)

(52) U.S. Cl. ......... 123/698; 123/574; 701/109; 701/113

(58) Field of Classification Search .................. 123/572, 123/698, 299, 300, 478, 480; 701/109, 104, 701/113
See application file for complete search history.

(56) References Cited

U.S. PATENT DOCUMENTS

| | | | | |
|---|---|---|---|---|
| 5,331,940 | A | 7/1994 | Takayama | |
| 5,546,918 | A * | 8/1996 | Mayer et al. | 123/674 |
| 7,311,094 | B2 * | 12/2007 | Mallebrein et al. | 123/698 |
| 2003/0200952 | A1 * | 10/2003 | Ito et al. | 123/305 |

(Continued)

FOREIGN PATENT DOCUMENTS

| | | | |
|---|---|---|---|
| DE | 10 2004 008 891 | | 9/2008 |
| WO | WO2005080775 | * | 9/2005 |

*Primary Examiner* — Willis R Wolfe, Jr.
*Assistant Examiner* — Anthony L Bacon
(74) *Attorney, Agent, or Firm* — Merchant & Gould P.C.

(57) ABSTRACT

The invention deals with a method for operating an internal combustion engine with engine oil as the lubricant, wherein a fuel mass flow outgassing from the engine oil is ascertained and is taken into account via a map-based pilot control during the metering of a quantity of fuel supplied to the internal combustion engine and wherein a fuel/air ratio supplied to the internal combustion engine is determined. Provision is made in the method according to the invention for a mass flow offset determined from the deviation of the fuel/air ratio supplied to the internal combustion engine from a nominal value to be taken into account when the metering of the quantity of fuel supplied to the internal combustion engine occurs during an effective duration of the map-based pilot control. The mass flow offset takes the deviation into account, which remained after the correction by a map-based pilot control of the quantity of fuel metered, on the basis of the modeled outgassing of fuel from the engine oil, and said mass flow offset balances the lambda controller in this way. The mass flow offset can by way of example have the effect of shortening the duration injection. The mixture deviations as a result of different boiling curves of the components of the fuel blend, which cannot be completely taken into account by the map-based pilot control under all operating conditions of the internal combustion engine, can in this way be compensated.

9 Claims, 1 Drawing Sheet

U.S. PATENT DOCUMENTS

2003/0200958 A1 10/2003 Ito et al.
2004/0099252 A1* 5/2004 Nagaishi et al. .............. 123/480
2006/0201487 A1 9/2006 Mallebrein et al.
2007/0156322 A1* 7/2007 Soga et al. .................... 701/104

* cited by examiner

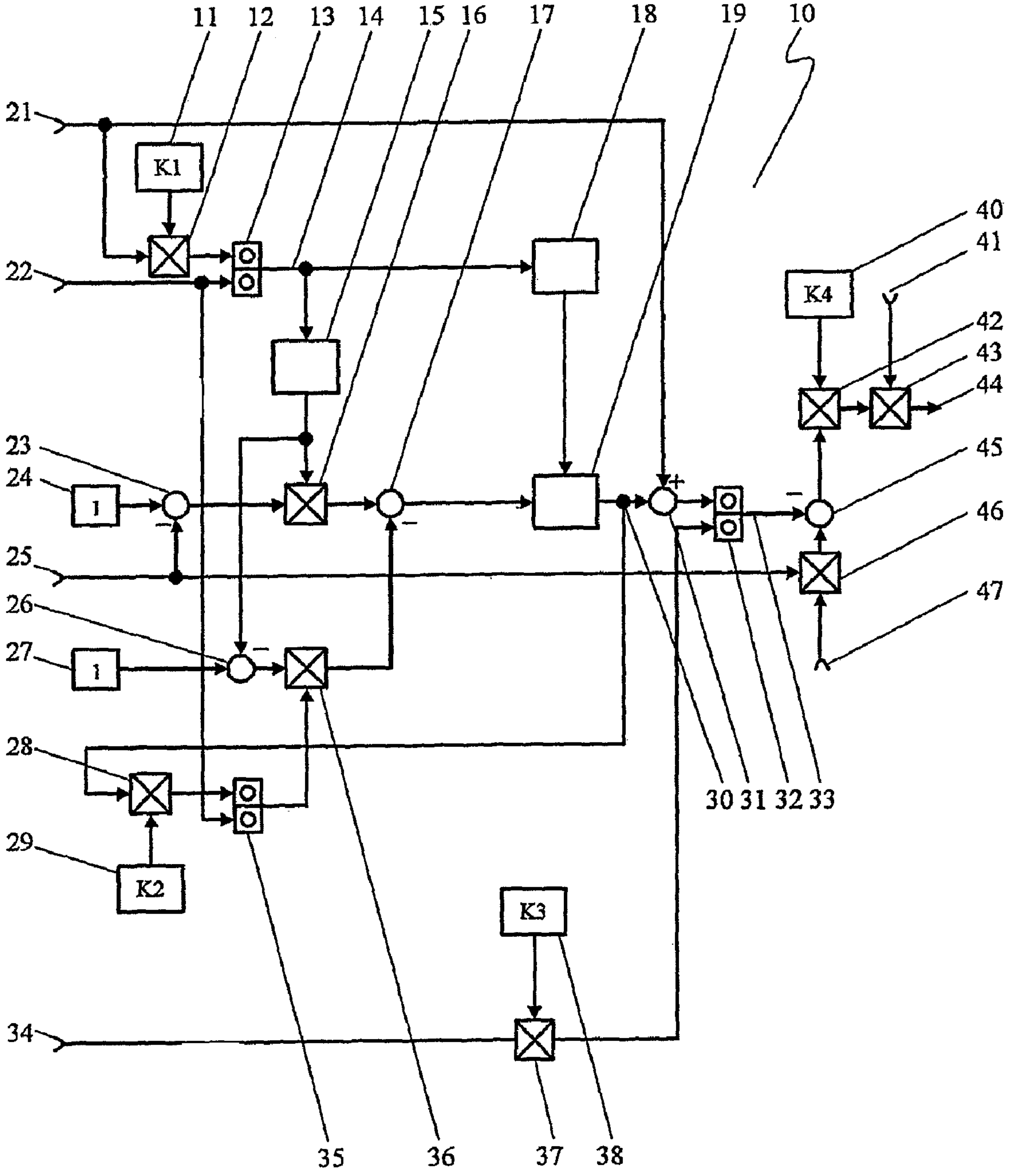
11 12 13 14 15 16 17 18 19 10
21
22
K1
40
41
K4
42
43
44
45
46
47
23
24
1
25
26
27
1
28
29
K2
K3
34
30 31 32 33
35 36 37 38

METHOD FOR TAKING THE OUTGASSING OF FUEL FROM THE ENGINE OIL OF AN INTERNAL COMBUSTION ENGINE INTO ACCOUNT

TECHNICAL FIELD

The invention deals with a method for operating an internal combustion engine with engine oil as the lubricant, wherein a fuel mass flow outgassing from the engine oil is ascertained and is taken into account via a map-based pilot control during the metering of quantity of fuel supplied to the internal combustion engine and wherein a fuel/air ratio supplied to the internal combustion engine is determined.

BACKGROUND

Internal combustion engines on the basis of Otto (gasoline) engines are generally operated with fuel from hydrocarbons produced from fossil fuels based on refined crude oil. Ethanol produced from renewable resources (plants) or another kind of alcohol is increasingly being added in various mixing ratios to the fuel. In the USA and Europe a mixture of 75-85% ethanol and 15-25% gasoline is often distributed under the trade name E85. The internal combustion engines are designed in such a way that they can be operated with pure gasoline as well as with mixtures up to E85. This is denoted as a “flex-fuel operation”. The operating parameters in the flex-fuel operation have to be adapted in each case to the existing fuel mixture for an efficient operation with only a small discharge of toxic emissions; while at the same time high engine performance is guaranteed. A stoichiometric fuel-air mixture ratio is, for example, present at 14.7 parts of air per part of gasoline; however, when using pure ethanol, a proportion of air of 9 parts must be set.

The taking of the fuel, which has ingressed into the engine oil during cold starting, into account as well as the fuel evaporating out of the engine oil at high temperatures has to fundamentally take place with all internal combustion engines; however, is mainly employed with Otto (gasoline) engines with a flex-fuel-mode of operation.

Ethanol and gasoline have different evaporation properties. Ethanol evaporates at a lower temperature to a lesser degree than gasoline, so that more ethanol has to be metered in during cold starting than is the case for gasoline. This leads to the fact that when cold starting with ethanol and during the subsequent warm-up phase, considerably more fuel is wiped from the cylinder walls into the engine oil via the piston rings. When the temperature of the engine oil increases, this fuel evaporates and is added via the crankcase ventilation system to the fresh air supply provided to the engine. The total amount of fuel situated in the engine oil is only expelled during extended warm-up phases. The additional richening of the mixture caused by the evaporated fuel has to be taken into account. Especially during low load-rotational speed-conditions, this richening can be significant. The richening of the fuel mixture can be taken into account by the closed-loop lambda control at certain percentages. This can, however, be insufficient in certain cases and can at the least lead to drivability problems during a dynamic operation mode.

A first beginning for improving the aforementioned problem is according to the technical field to track the number of cold starts and to gradually reset this counter in the warm-up phases. If the cold start counter exceeds a predetermined value and if the temperature of the engine oil exceeds a typical value of 70EC to 90EC for the outgassing, the lambda controller will be decontrolled in a range expanded to small values in order to take into account the proportion of the fuel, which has evaporated out of the engine oil.

In a document of the applicant (reference number: DE 102004008891.8), it is additionally proposed to model the mass flow of the fuel outgassing from the engine oil and to take said mass flow into account as a pilot control value when calculating the quantity of fuel to be metered. Especially among other things the quantity of fuel collected in the engine oil, the composition of the fuel as well as the temperature history and the current temperature of the engine oil are included in the fuel mass flow determined from the model. The modeling described prevents deviations of the composition of the fuel/air mixture; however, not in all desired operating conditions and partially not with the desired accuracy.

In the U.S. Pat. No. 5,331,940, a device and a method for taking the outgassing of fuel into account from the engine oil of an internal combustion engine with a positive crankcase ventilation are described. The positive crankcase ventilation thereby carries a portion of the intake air flow over the camshaft housing and the crankcase housing and can, depending on the operating state of the internal combustion engine, via a valve variably controlled add this intake air flow to the to the fresh air supply before the fuel metering. In a first step, a nominal quantity of injected fuel is determined from a quantity of fresh air supplied to the internal combustion engine and the engine’s rotational speed. If it is detected by means of a least deviation of the lambda value of the exhaust gas of the internal combustion engine from its nominal value that an outgassing of fuel from the engine oil is to be taken into account, an expected quantity of outgassing is determined from a characteristic diagram plotted versus engine rotational speed and nominal quantity of fuel injected while taking into account the time function. The characteristic diagram is corrected by evaluating a deviation, which still remains, of the lambda value from the nominal value.

It is the task of the invention to provide a method, which allows for an improved way of taking the outgassing of fuel from the engine oil of an internal combustion engine into account and which balances the control deviation of the lambda controller.

SUMMARY

The task of the invention is thereby solved, in that a mass flow offset determined from the deviation of the fuel/air ratio, which is supplied to the internal combustion engine, from a nominal value is taken into account when metering the quantity of fuel supplied to the internal combustion engine during an operative duration of the map-based pilot control. The mass flow offset takes into account the deviation remaining after the correction of the metered quantity of fuel by a map-based pilot control on the basis of the modeled outgassing of fuel from the engine oil and, thus, balances the lambda controller. The mass flow offset can by way of example have the effect of shortening the duration of injection. The mixture deviations as a result of different boiling curves of the components of the fuel blend, which cannot be completely taken into account by the map-based pilot control under all operating conditions of the internal combustion engine, can in this way be compensated. Instead of the map-based pilot control, another variable derived from the modeled or measured outgassing of fuel from the engine oil can also be used for the first correction and can be improved by determination the mass flow offset. In contrast to the procedural approach proposed in the U.S. Pat. No. 5,331,940, the value of the outgassing used for the map-based pilot control is taken from a model and not from a characteristic diagram, which is adapted during the operation. This has the advantage, in that deviations can be more quickly corrected via the closed-loop control, and in that faulty corrections have no aftereffect during a renewed start-up of the same operating point. The correction of the remaining lambda deviation is implemented according to the invention with the mass flow offset, whose value, however, is not stored.

If the mass flow offset is determined from a control intervention by a closed-loop lambda control, for example from a lambda control factor, a deviation, which remained after the modeling of the outgassing of fuel from the engine oil, can also be effectively taken into account.

If the speed of the adaptation of the mass flow offset is selected as a function of the fuel mass flow outgassing from the engine oil and a fresh air mass flow drawn in by the internal combustion engine, the deviation can be quickly compensated when a high fuel mass flow outgasses; and in the case of small deviations, the compensation takes place with a reduced danger of control fluctuations. Furthermore, the procedural variation prevents the control system from forgetting the adaptation if the fuel mass flow of the outgassing is not relevant for the complete mixture, and it can have the effect that errors in the map-based pilot control are not or to only to a small degree interpreted as outgassing.

If the mass flow offset is selected as a function of the amount of the fuel mass flow outgassing from the engine oil and of the fresh air mass flow drawn in by the internal combustion engine, the quantity of fuel, which is outgassing, can quickly and with sufficient accuracy be taken into account during large deviations. In addition, this part of the correction can be switched off when a small or even a fading fuel mass flow is outgassing. Remaining deviations can then be attributed to mixing errors and fuel adaptations. That is why that in one such operating phase, effects of a faulty air volume determination, deviations in the quantity of fuel metered as well as adaptations to the mixing ratio of ethanol to gasoline can be corrected.

If the quantity of fuel supplied to the internal combustion engine is corrected by a relative proportion of fuel as a result of outgassing, if a fuel mass flow is calculated in a model for the outgassing of fuel from the engine oil, if the offset mass flow is determined from the deviation of the lambda control factor of a lambda control loop from its nominal value and if the correction variable: proportion of fuel as a result of outgassing is constructed from the sum of the mass flows of the fuel mass flow and the offset mass flow while taking into account the engine rotational speed, a first correction can then take place by taking the outgassing of fuel from the engine oil in the fuel mass flow into account in the form of a map-based pilot control, and a further correction of the mixture composition takes place by taking the offset mass flow into account. Altogether the fuel/air mixture supplied to the internal combustion engine is constructed in an enlarged range of operating conditions while taking into account the quantity of fuel being outgassed with a deviation from the nominal value being as small as possible.

Provision is made in an especially advantageous embodiment for the offset mass flow to be determined in an integrator and for the lambda control factor to be supplied to the integrator after said lambda control factor has been multiplied by a pilot control value for taking the outgassing of fuel from the engine oil into account after weighting with a proportion of fuel characteristic curve and/or for the integration speed of the integrator to be determined with a speed characteristic curve, whose output value is a function of the pilot control value and/or for a value derived from the mass flow offset to be subtracted from the input value of the integrator while taking the proportion of fuel characteristic curve into account. In this embodiment, the lambda control factor effectively contributes to taking the deviations as a result of outgassing fuel from the engine oil into account if the model does not predict a small amount of outgassing. In such a case, deviations can be attributed to other factors than to the contribution made by the proportion of fuel as a result of outgassing. Furthermore, the speed of the integrator can be increased when there is a predicted high amount of outgassing from the model for outgassing so that the deviation can be compensated as quickly as possible. By means of the feedback of the value derived from the mass flow offset and the subtraction of said value from the input signal of the integrator, the output signal of said integrator, the mass flow offset, can be reduced to zero after a fairly long warm-up phase, after which an outgassing can no longer be expected. An aftereffect of the correction can thus be prevented without an outgassing being present. The feedback can take place within the parameter value according to the invention without a step change in the mixture. The deviations of the lambda signal from the nominal value, which are then still remaining, can be attributed to other deviations in the mixture formation.

If the method according to the invention for operating an internal combustion engine is used to power a motor vehicle with a fuel blend from gasoline and ethanol, the share of fuel, which has ingressed into the engine oil during cold-start and warm-up phases, can especially well be taken into account for the mixture formation. The varying distillation characteristics of the different fuel blends can in particular effectively be taken into account.

BRIEF DESCRIPTION OF THE DRAWING

The invention is explained below in detail using an example of embodiment depicted in the FIGURE. The following is shown:

FIG. 1 is a schematic of the logical interconnection of the modules for implementing the method according to the invention.

DETAILED DESCRIPTION

FIG. 1 shows a schematic for implementing the method according to the invention of an adaptation determination 10 for taking the fuel evaporating from the engine oil of an internal combustion engine into account during the open-loop control of the mixture formation of a fuel/air mixture. An ascertained, relative fresh air charge 47 is multiplied by a lambda control factor 25 for the open-loop control of the fuel/air mixture for operating the internal combustion engine in an eighth multiplication stage 46. A proportion of fuel resulting from outgassing 33 determined according to the invention is subtracted in a fourth subtraction stage 45 from the result of said eighth multiplication stage 46. The result of said fourth subtraction stage 45 is a proportion of fuel relevant for the fuel injection. Said proportion fuel is multiplied by a fourth constant 40 in a sixth multiplication stage 42 and by a fuel factor 41 in a seventh multiplication stage 43 and is converted into an injection duration 44.

In a model for the outgassing of fuel from the engine oil, a fuel mass flow 21 is determined, which enters into the adaptation determination 10. A mass flow offset 30 determined in the method according to the invention is added to the fuel mass flow 21 in an addition stage 31 and is altered in a second division stage 32 to the proportion of fuel as a result of outgassing 33 while taking an engine rotational speed 34 into account, which is multiplied by a third constant 38 in a fifth multiplication stage 34. The proportion of fuel as a result of outgassing 33 takes the fuel mass flow outgassing from the engine oil into account in an improved manner and reduces the quantity of fuel in the fuel metering to be supplied to the internal combustion engine. The duration of injection 44 can by way of example be reduced by the proportion of fuel as a result of outgassing 33.

The mass flow offset 30 is the output signal of an integration stage 19. The lambda control factor 25, which is reduced by its nominal value, which comes from a first input device for nominal values 24, in a second subtraction stage 23 is provided to the integration stage 19 after a proportion of fuel characteristic curve has been taken into account in a second multiplication stage 16. Deviations of the lambda control factor 25 from the nominal value are integrated in this manner and lead to a mass flow offset 30. The value of the modeled fuel mass flow 21 is provided to the proportion of fuel characteristic curve 15 after said value has been multiplied by a first constant 11 in a first multiplication stage 12 and divided by a fresh air mass flow 22 in a first division stage 13 and after such a pilot control value 14 for a proportion of the outgassing of the fuel requirement, a so-called outgassing rate, has been constructed. These conversions serve to transform the variables into a uniform system of units. The proportion of fuel characteristic curve 15 serves the purpose of taking a large share of the deviations of the lambda control factor 25 from the nominal value into account for a high modeled mass flow 21; however, only a small share in the case of a low modeled fuel mass flow 21.

The pilot control value 14 for the outgassing rate is furthermore provided to a speed characteristic curve 18, whose output signal causes the speed of the integrator 19 to assume a high value in the case of high values of the modeled fuel mass flow 21 and average and small air masses and to assume a low value in the case of low values of the modeled fuel mass flow 21.

During a fairly long warm-up phase, all of the fuel is expelled from the engine oil, so that the adaptation determination 10 according to the invention is unnecessary. In this instance, it is to be kept in mind that no step changes in the mixture may occur. This function is brought about according to the invention, in that the mass flow offset 30 is converted and is subtracted from the input signal of the integrator 19 in a suitable manner. In so doing, the value of the mass flow offset 30 is returned to a neutral value. The mass flow offset 30 is multiplied by a second constant 29 in a third multiplication stage 28 and is divided by the fresh air quantity 22 in a third division stage 35. In so doing, a variable arises, which is in the same system of units as the lambda control factor 25. The variable is multiplied by the deviation of the proportion of fuel characteristic curve 15 from "1" in a fourth multiplication stage 36 in order to receive a small share when the pilot control value 14 for the outgassing rate is large; however, to cause an increased share to reduce the offset when the pilot control value 14 for the outgassing rate is becoming smaller. In so doing, the share at the end of an outgassing phase is reduced and step changes in the mixture are reduced. The deviation of the proportion of fuel characteristic curve 15 from "1" is determined by the output signal of the proportion of fuel characteristic curve 15 being subtracted from the value of a second input device for nominal values 27 in a third subtraction stage 26. The output signal of the fourth multiplication stage 36 represents a feedback signal for the integrator 19 and is subtracted from its input signal in a first subtraction stage 17.

When a fuel mass flow, which is predicted from the model for the outgrassing of fuel from the engine oil becomes smaller, the taking of the output signal of the proportion of fuel characteristic curve 15 into account in the second multiplication stage 16 and in the third subtraction stage 26 causes on the one hand the lambda control factor 25 to contribute less to the input signal of the integrator 19 and furthermore effects a mixture deviation corrected by the mass flow offset 30 in a way that it can be reduced without a step change in the mixture.

The invention claimed is:

1. A method of operating an internal combustion engine with an engine oil as a lubricant, wherein a fuel mass flow outgassing from the engine oil is calculated in a model and is taken into account via a map-based pilot control during a metering of a quantity of fuel supplied to the internal combustion engine, and wherein a fuel/air ratio supplied to the internal combustion engine is determined as a lambda control factor, the method comprising:

selecting warm-up phases of the map-based pilot control; wherein the warm-up phases are based on evaporation properties;

determining deviations of the lambda control factor from a nominal value during the relevant warm-up phases of the map-based pilot control;

determining a mass flow offset from the determined deviations as a function of a size of the fuel mass flow outgassing from the engine oil and a fresh air mass flow drawn in by the internal combustion engine, wherein determining the mass flow offset comprises:

taking into account a large share of the deviations of the lambda control factor from the nominal factor when the size of the fuel mass flow is large; and taking into account a small share of the deviations of the lambda control factor from the nominal factor when the size of the fuel mass flow is low.

2. A method according to claim 1, in that the mass flow offset is determined from a control intervention by a closed-loop lambda control.

3. A method according to claim 1, further comprising selecting an integrating speed of an adaptation of the mass flow offset as a function of the fuel mass flow outgassing from the engine oil and a fresh air mass flow drawn in by the internal combustion engine.

4. A method according to claim 2 further comprising correcting the quantity of fuel supplied to the internal combustion engine by a relative proportion of fuel as a result of outgassing, wherein the fuel mass flow is calculated in a model for the outgassing of fuel from the engine oil, and wherein the offset mass flow is determined from a deviation of the lambda control factor of the lambda control loop from its nominal value, and wherein a correction variable: proportion of fuel as a result of outgassing is constructed from a sum of the mass flows of the fuel mass flow and the offset mass flow while taking an engine rotational speed into account.

5. A method according to claim 2, further comprising determining the offset mass flow in an integrator, wherein the lambda control factor is provided to the integrator after it has been multiplied by a pilot control value for the taking of the outgassing of fuel from the engine oil into account after weighting with a proportion of fuel characteristic curve or in that the integration speed of the integrator is determined with a speed characteristic curve, having an output value that is a function of the pilot control value or in that a value derived from the mass flow offset is subtracted from the input value of the integrator while the proportion of fuel characteristic curve is taken into account.

6. A method according to claim 1, wherein a fuel blend comprising of a gasoline component and an ethanol component is utilized for operating an internal combustion engine to power a motor vehicle.

7. A method according to claim 2, wherein the closed-loop lambda control comprises a lambda control factor.

8. A method according to one of the claim 1, wherein the mass flow offset is determined with the aid of an integrator dependent on the amount of the fuel mass flow that is outgassing from the engine oil and the fresh air mass flow that is outgassing from the combustion engine, whereby the mass flow offset is converted and subtracted from the starting signal of the integrator in such a way that the value of the mass flow offset is returned to a neutral value.

9. The method according to claim 1, wherein the mass flow offset is determined with the aid of an integrator depending on the size of the fuel mass flow outgassing from the engine oil and a fresh air mass flow outgassing from the combustion engine, whereby the mass flow offset is converted and subtracted from a starting signal of the integrator in such a way that the value of the mass flow offset is returned to a neutral value.

* * * * *